Feb. 20, 1923.
A. E. H. BARILI
1,446,437
DIAL INDICATOR
Filed Dec. 8, 1921
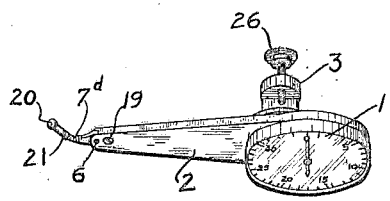
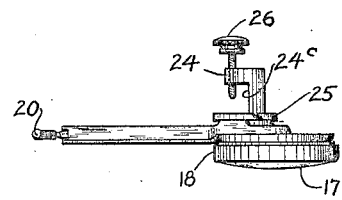
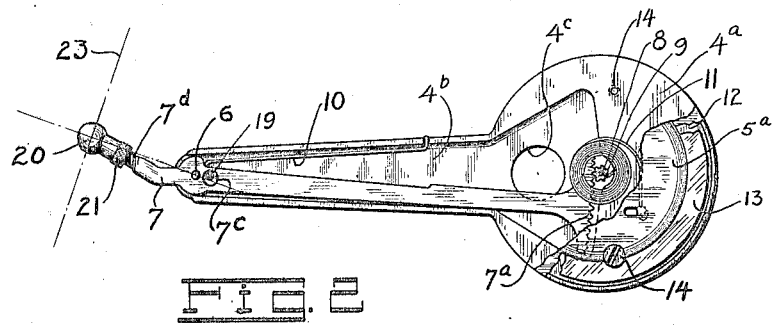
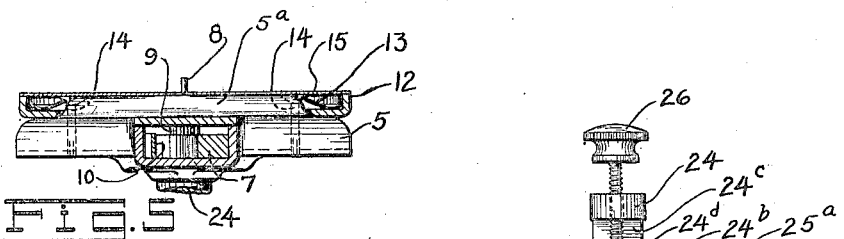
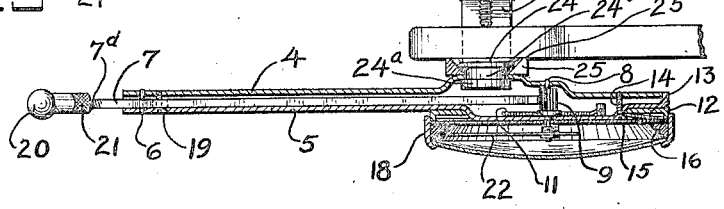
INVENTOR:
ARTHUR E. H. BARILI
By Oliver O. Martin
HIS ATTORNEY.

Patented Feb. 20, 1923.

1,446,437

UNITED STATES PATENT OFFICE.

ARTHUR E. H. BARILI, OF CHICAGO, ILLINOIS, ASSIGNOR TO EDWARD W. WALLACE, OF CHICAGO, ILLINOIS.

DIAL INDICATOR.

Application filed December 8, 1921. Serial No. 520,935.

*To all whom it may concern:*

Be it known that I, ARTHUR E. H. BARILI, a citizen of the United States, residing at Chicago, in the county of Cook and State of Illinois, have invented new and useful Improvements in Dial Indicators, of which the following is a specification.

The present invention is directed to means for indicating very fine dimension variations, and has particular reference to a device on which such variations are readable on a graduated dial.

Indicators of the type referred to are indispensable in manufacturing and machine and tool building establishments where modern methods prevail. Before the advent of dial indicating gauges such establishments had to rely upon vernier gauges, which, as any one versed in the art will appreciate, are slow of operation, difficult to set delicately enough to obtain fine readings, and dangerous to rely upon, because such readings are indirectly obtained and therefore dependent upon the reliability of the operator. Dial gauges are direct reading and respond instantly, but such dial indicators as have heretofore been in use have also been much more bulky and cumbersome to handle, under certain conditions, than the older type of gauges.

The object of this invention is the provision of a dial indicating gauge of very small and convenient shape. A further object is to provide an indicator of great simplicity and cheapness of manufacture. Another object is the introduction of improved means for attaching the indicator to the tool or machine in connection with which it is required to use the indicator.

For the purpose of describing a structure embodying the invention, and with a view to explain the objects of my invention, I have herewith provided a drawing, in which the important features of the invention are clearly illustrated.

In the drawing:

Fig. 1 is a perspective view of a structure embodying the invention.

Fig. 2 is a corresponding side view of the device on a larger scale, the front half being removed.

Fig. 3 is a sectional top view of the indicator,

Fig. 4 is a similar view showing the natural size of the device,

Fig. 5 shows, on a large scale, parts of the device, and portions of this view are shown in section for the sake of clearness.

The structure of my invention may be divided into three main portions, a dail indicator 1, a lever mechanism 2, and an attachment device 3. The indicator and the lever mechanism are enclosed within a casing comprising a backing 4 and a cover 5. These two parts are each made from thin sheet metal of substantially the size and shape indicated in Fig. 1. The member 4 comprises a flat circular portion 4$^a$ and a channel shaped extension 4$^b$, and it is noticed that the said flat portion is made with a depression of a depth corresponding with the depth of the said channel. The outer end of the channel is perforated to receive a pivot 6 on which a lever 7 is rigidly secured. The center of the circular portion 4$^a$ is perforated to receive a staff 8, on which a pinion 9 is firmly held. The inner end of the lever 7 terminates in a segmental head, the periphery of which is provided with gear teeth 7$^a$ in mesh with the said pinion 9. A resilient member 10 functions to maintain the lever in its normal, retracted position, as indicated in Fig. 2.

The other member, 5, of the casing carries the same contour as the member 4, but the circular portion of this piece is made with a concentric depression 5$^a$, aside from which the whole member is entirely flat. The depression 5$^a$ affords working space for a hairspring 11, the inner end of which is fastened to the staff 8, while its outer end is suitably clamped on the member 5. An annular cup-shaped ring 12 is seated on the outer surface of said member, and the perforation of this ring is of a size to fit the projecting cup 5$^a$ loosely in order that the ring may be rotated on the cup. A suitable spring ring 13 is placed within the cup-ring 12 whereupon a plurality of screws 14 are provided and caused to clamp the said ring and the two members of the casing together. A dial 15 is next placed within the cup-ring, whereupon a bezel 16 and a crystal 17 are added, and the parts are finally pressed together and held combined by an annular cover 18.

For the sake of strengthening the structure it is well to clamp the outer extremities of the casing together, as by a screw 19, and for the purpose of accommodating this screw, the lever 7 is provided with a perforation 7c large enough to afford space for the free operation of the lever. The outer end of this lever is provided with screw-threads 7d, on which a contacting head 20 is adjustably fitted and locked in position by a threaded nut 21. A pressure on this contacting head results in a movement of the lever against the tension of the spring 10, and this movement transmits turning movement to the pinion 9 and the staff 8. On the outer end of the staff is rigidly mounted a pointer 22 which, turning with the staff, registers the amount of movement of the contacting head on the dial 15.

The spring 10 is suitably fastened on the casing member 4, near the circular head 4a, and it extends to a point very close to the pivot 6. It is important to note this relation because of the resultant evenness of the pressure exerted by the spring on the lever at this point. The outer end of the lever is preferably bent at substantially 45°, and the gauge should be applied substantially at this angle, as indicated by the broken line 23. There is a distinct advantage in operating the gauge at such angle, as it affords more room for the application of the gauge to the work to be gauged.

In the depression of the casing member 4 is provided a circular perforation 4c, through which a stud 24 is projected from within the casing, and this stud is made with a head 24a slightly larger than the said perforation in order that the stud may not be drawn entirely through the perforation. An annular groove 24b is made in the stud directly outside the casing, and a spring-ring 25 is snapped into position in this groove for the purpose of maintaining the stud projected. A notch 24c is cut into the stud, from one side, directly outside said groove, and a screw 26 extends from the end of the stud into this notch. The notch and set-screw are provided for the purpose of attaching the gauge to a desired support. Now it is noticed that the outer face 25a, of the spring-ring projects slightly beyond the inner surface 24d of the notch, as a consequence of which relation the gauge may be turned to any desired angle, relative to its support and that it then may be clamped firmly in position by the said screw, the spring-ring being pressed firmly against the outer surface of the casing.

The movement of the pointer 22 is adjusted relative to the movement of the contacting head 20 by adjusting the latter longitudinally on the screw-threads 7d, whereby the gauge in the first instance is set to register correctly the values given on the graduated dial. The lever 7 is by the spring 10 brought to a solid stop against the wall of the casing channel 4b, and as this lever is directly connected to turn the pointer 22, it follows that the latter also is brought to a stop at a certain place. After the dial and crystal have been mounted in place, it is only necessary to turn these parts, which are yieldingly clamped in place by the spring-ring 13, until the zero of the dial registers with the pointer. Often the indicator is mounted on a support and set to register a certain height by applying it to a vernier height-gauge, and in clamping the indicator in set position it is found difficult to bring the pointer into registration with the zero of the dial, and much time and effort is saved in adjusting the dial to the pointer rather than the pointer to the dial.

There are other important features in this structure which may not appear to the observer at first glance. One such feature is the extreme compactness of the device, which is no larger than the structure exhibited in Figs. 1 and 4; another feature is its great simplicity. There is only the one operating lever 7, and yet each graduation on the dial represents one one-thousand part of an inch. In order to attain this pronounced gear ratio with only one set of gears it follows that the pinion 9 must be of extremely fine pitch and that it can only contain very few teeth, eight teeth being the maximum which I have found it commercially possible to employ. Now it is well known that a pinion of eight teeth or less does not operate very smoothly when driven by a segment of relatively so great radius as to approach the shape of a rack. But upon examination it is noticed that this pinion really is not driven at all, when the contacting lever is moved forward against the tension of the spring 10, because the spring 11 is so hung and wound as to urge the pinion to move in the same direction. As a consequence it is found that the pinion is urged to follow the advance of the segment by the slight pressure of the delicate hair spring 11, and that the resulting movement is smooth and quiet. For a long time it was my belief that the hair spring must be mounted and wound to oppose the movement of the pinion, in order to prevent blacklash between the parts, but I found the resulting movement jerky, gritty and noisy, and I despaired of producing a commercially successful indicator of such small compass and cost. Reversing the hair spring, as just explained has, however, completely solved this problem. It may be suggested that the return of the pinion will be accompanied by similar jerkiness and grittiness, but it is to be noticed that the hair spring then is partly unwound, and furthermore it must be remembered that the spring 10 compels this return movement, wherefore no unevenness is felt by the operator. Also that the indicator is set on the advance stroke, when smoothness and evenness is requisite; the return stroke is idle.

I claim:

1. In a dial indicator, a casing comprising a circular portion from which extends a channeled arm, a pinion mounted to turn in the center of said circular portion, a lever pivoted at the extremity of said arm and terminating in a segmental head in mesh with said pinion, and a contacting head adjustably fixed on the outer end of said lever.

2. In a dial indicator, a hollow casing comprising two sheet metal members having each a circular portion and a projecting arm, a dial mechanism mounted to turn on one of said members, a staff centrally located within said circular portion and carrying a pointer for registration with said dial mechanism, and a work contacting lever pivoted at the outer end of said arm and connected to rotate said pointer.

3. In a dial indicator, a hollow circular casing having a channeled extension, an adjustable dial mechanism concentric on said casing, a concentric pointer, work contacting means including a lever pivoted in said extension and having means extending into the casing for rotating said pointer, and adjustable attaching means on the casing opposite said dial mechanism.

4. In a dial indicator, a hollow casing comprising a circular portion and an extending arm, a dial mechanism concentric on one side of said casing, a pointer, a work contacting lever pivoted at the extremity of said arm and extending into the center of the casing for moving said pointer, a projecting stud rotatable on the opposite side of the casing for attaching and adjusting the indicator on a support, and means for clamping the indicator in adjusted position.

5. In a dial indicator, a hollow casing having a circular portion, an attachable stud rotatably seated in said circular portion, said stud having a rectangular slot in the side, a spring-ring engaging a groove in said stud and having its face beyond the end of said slot, and a thumbscrew extending into said slot for the purpose of clamping the indicator in place.

6. In a dial indicator, a hollow two part casing having a circular portion from which extends a channeled arm, one side of said circular portion having a concentric depression, a cup-shaped member rotatable on the casing around said depression, a spring-ring seatable in said member, a plurality of screws extending through the parts of the casing for clamping said parts together, said screws also operating upon the said spring-ring to put friction on said cup-shaped member, and a dial mechanism attachable to said cup member.

7. A dial indicator comprising, a circular casing provided with an extending arm, a concentrically pivoted indicating member, an oscillatory work contacting lever pivoted at the outer end of said arm and connected to rotate said indicating member, a flat spring having its inner end fastened at the inner end of said arm and so positioned that its outer end bears on said lever in close proximity to the lever pivot in order to obtain uniform pressure on the lever, and a fine hair spring so placed and wound within the casing as to urge said indicating member forward against the tension of the flat lever spring.

8. In a dial indicator, a casing comprising a circular portion and a channeled arm extending therefrom, an indicating member pivoted in said circular portion, a work contacting member pivoted at the outer end of said arm and fitted to rotate said indicating member, a relatively strong spring operating upon said contacting member to oppose its movement, and a relatively light spring operating to urge forward rotation of the said indicating member.

9. In a dial indicator, a two piece sheet metal casing, each half portion of the casing comprising a circular part provided with an extending arm, an indicating member centrally pivoted in said circular portions, a lever pivoted at the outer extremity of said arm, said lever having a projecting contacting head and provided with an inward extension engaging said indicating member for simultaneous movement, means yieldingly maintaining said lever at rest, and means urging the indicating member forward.

In testimony whereof I have hereunto affixed my signature.

ARTHUR E. H. BARIL.